US005970418A

United States Patent [19]

Budd et al.

[11] Patent Number: 5,970,418

[45] Date of Patent: Oct. 19, 1999

[54] PERSONAL COMMUNICATOR INCLUDING A HANDSET PHONE WITH AN INTEGRATED VIRTUAL IMAGE DISPLAY

[75] Inventors: Russell Alan Budd, North Salem; John Peter Karidis, Ossining; Gerard McVicker, Wappingers Falls, all of N.Y.

[73] Assignee: International Business Machines Corporation, Armonk, N.Y.

[21] Appl. No.: 08/689,546

[22] Filed: Aug. 9, 1996

Related U.S. Application Data

[60] Provisional application No. 60/004,218, Sep. 21, 1995.

[51] Int. Cl.[6] .......... H04B 1/38

[52] U.S. Cl. .......... 455/550; 455/566; 379/93.17

[58] Field of Search .......... 455/74, 556, 550, 455/575, 90, 566; 348/40, 51; 349/74; 359/277; 345/5–9; 379/93.17

[56] References Cited

U.S. PATENT DOCUMENTS

| | | | |
|---|---|---|---|
| 4,481,382 | 11/1984 | Villa-Real | 179/2 EA |
| 4,713,778 | 12/1987 | Baker | 364/513.5 |
| 4,910,396 | 3/1990 | Grove | 359/277 |
| 5,003,300 | 3/1991 | Wells | 340/705 |
| 5,023,905 | 6/1991 | Wells et al. | 379/96 |
| 5,048,077 | 9/1991 | Wells et al. | 379/96 |
| 5,091,719 | 2/1992 | Beamon, III | 340/705 |
| 5,184,232 | 2/1993 | Burney | 348/40 |
| 5,189,512 | 2/1993 | Cameron et al. | 358/93 |
| 5,276,471 | 1/1994 | Yamauchi et al. | 351/153 |
| 5,281,957 | 1/1994 | Schoolman | 345/8 |
| 5,303,085 | 4/1994 | Rallison | 359/631 |
| 5,331,333 | 7/1994 | Tagawa et al. | 345/7 |
| 5,334,991 | 8/1994 | Wells et al. | 345/8 |
| 5,335,276 | 8/1994 | Thompson et al. | 455/74 |
| 5,390,246 | 2/1995 | Gay et al. | 381/24 |
| 5,404,074 | 4/1995 | Watanabe et al. | 455/74 |
| 5,491,491 | 2/1996 | Lebby et al. | 345/7 |
| 5,508,713 | 4/1996 | Okouchi | 455/556 |
| 5,594,563 | 1/1997 | Larson | 349/74 |
| 5,633,762 | 5/1997 | Richard | 359/817 |
| 5,644,427 | 7/1997 | Omori et al. | 348/51 |
| 5,684,497 | 11/1997 | Hildebrand et al. | 345/8 |
| 5,821,911 | 10/1998 | Jachimowicz | 345/7 |

FOREIGN PATENT DOCUMENTS

| | | | |
|---|---|---|---|
| 0 352 914 A2 | 6/1989 | European Pat. Off. | H04M 11/06 |
| 0 559 406 A1 | 3/1993 | European Pat. Off. | G02B 27/00 |
| 0 564 940 A1 | 3/1993 | European Pat. Off. | H04N 5/64 |
| 0 679 984 A1 | 4/1995 | European Pat. Off. | G06F 3/00 |
| 0 817 393 A2 | 6/1997 | European Pat. Off. | H04B 1/38 |
| WO 96/35288 | 5/1996 | WIPO | H04M 1/72 |

OTHER PUBLICATIONS

Huffman, David: "The Role of Infrared Communications in High Content Pagers and Multimedia Mobile Phones," Reflection Technology, pp. 1–11 and "Display Evaluation Kit," 2 pp., 1996.

*Primary Examiner*—Dwayne D. Bost
*Assistant Examiner*—Tracy M. Legree
*Attorney, Agent, or Firm*—Heslin & Rothenberg, P.C.; Wayne F. Reinke, Esq.

[57] ABSTRACT

A wireless handset phone, virtual image display coupled to the wireless handset phone and pointing device for pointing on the virtual image display are included. The communicator may also include a limited-function computer. The virtual image display uses optics to create the virtual image. The pointing device may include a virtual selector; that is, an array of sensors or switches to accommodate different users' hands.

15 Claims, 16 Drawing Sheets

PERSONAL COMMUNICATOR INCLUDING A HANDSET PHONE WITH AN INTEGRATED VIRTUAL IMAGE DISPLAY

This application claims the benefit of U.S. Provisional Application Ser. No. 60/004,218, filed Sep. 21, 1995.

BACKGROUND OF THE INVENTION

1. Technical Field

The present invention generally relates to communication devices. More particularly, the present invention relates to personal communication devices including both audio and a display.

2. Background Information

A major market (predicted to be over $1.5 billion dollars annually by 2000) is beginning to develop for compact devices combining cellular (or other wireless) telephones with a limited-function computer. An early example of this class of devices being called "personal communicators" is the IBM/Bell-South "SIMON". In its present form, the SIMON adds a relatively small computer (8086-class, moving to 80386-class), plus a backlit, touch-sensitive display to a cellular telephone. This combination of computer, wireless communication, and enabling software creates a powerful productivity tool which allows a single device to provide wireless telephony functions, personal information management (e.g., electronic calendar and address/phone number listings), as well as two-way wireless transfer of digital data.

Some of the limitations of these devices have heretofore included the difficulty of viewing the data display while communicating over the phone, the weight and fragility of the relatively large LCD display, the relatively high power required for the back-lit monochrome display, and the even higher cost and power to provide a color display.

Furthermore, the touch- and stylus-based user interface generally requires two hands to operate and precludes the simultaneous use of the phone handset and the computer functions, except in a speaker-phone mode where the user would have to speak to the unit while holding it in front of him. While speech-based operation will be added to these devices in the future, a practical speech-based user interface still requires the user to see a display during use. The reason is that for speech navigation, the user needs to see the set of allowable selections (the menu items), while for dictation mode, the user would like to see the progress of the speech-to-text translation.

As an alternative to SIMON-like designs which make it difficult to utilize the phone handset in the normal, private (non-speakerphone) mode while also viewing the display, it has been suggested that the personal communicator should be fashioned like a pair of glasses or goggles, with a view-finder like "projection" display and a speaker and microphone all built into the "frames" of the headset. While this interaction paradigm may eventually become common and widely accepted (probably by today's video-game generation), it is not as natural or convenient for the user who frequently needs to make a quick phone call or needs to just briefly check some e-mail.

Another possible alternative is to make a SIMON-like device where the display can be detached from the unit and held in the front of the user by the hand opposite the one holding the phone. An infrared or other wireless link between the phone and the display would allow data coming over the main handset to be relayed to the display. Although this design does allow simultaneous viewing/talking, it requires two hands for simple operation and makes pointing or selecting an item from the display a difficult (possibly three-handed) operation.

Thus, a need exists for an improved personal communication device including both audio and a display.

SUMMARY OF THE INVENTION

Briefly, the present invention satisfies the need for an improved personal communicator by providing a handset phone with an integrated virtual image display, a means for pointing and means for selecting on the virtual image.

In accordance with the above, it is an object of the present invention to provide a personal communicator with both audio and visual capabilities.

It is a further object of the present invention to provide a personal communicator with a phone function and virtual image display.

It is still another object of the present invention to provide a personal communicator with an integrated pointing and selecting capability.

The present invention provides a personal communicator, comprising a handset phone, a virtual image display coupled to the handset phone, means for pointing and means for selecting on the virtual image display. The personal communicator may further comprise a computer, and/or a gravity-responsive switch for rotating the virtual image based on right-handed or left-handed use of the communicator.

These, and other objects, features and advantages of this invention will become apparent from the following detailed description of the various aspects of the invention taken in conjunction with the accompanying drawings.

BEST MODE FOR CARRYING OUT THE INVENTION

The personal communicator of the present invention can assume many different embodiments, as will become clear from the following description. However, each embodiment disclosed herein includes, in some fashion, a handset phone, a virtual image display, means for pointing and a means for selecting on the virtual image display. Some general comments regarding all of the embodiments will first be given.

The virtual image preferably looks more or less the same (subtending the same visual angle and potentially having the same resolution) as a 10-inch notebook display or a 14-inch display on a desktop. Some people have one strongly dominant eye, so they might have to use the personal communicator on a particular side of their head while others would be able to transfer the phone from one ear to the other, as long as the display properly rotates. Preferably, when the display is rotated between left-side and right-side positions, a switch (which may be, for example, gravity operated) is activated that automatically flips the image on the display to maintain the proper orientation.

For pointing and menu selection tasks, the handset phone also incorporates a pointing device, which could be positioned, for example, where the users thumb would naturally rest. Alternately, it might be positioned at a comfortable position for operation by some other finger.

Of course, to enable the actual selection of an item which is under the cursor (or otherwise highlighted), there is also included one or more "mouse" selection buttons or other selectors which can be used in conjunction with the pointing device. Although two fixed selection buttons on the handset would form a functional solution, it is also possible to provide "virtual" selectors that do not require the user to precisely position the fingers to specific gripping positions by covering at least one edge of the handset portion of the personal communicator with a relatively high-resolution array of pressure sensors, small switches, or the like. If the spacing between the sensors/switches is smaller than a given average finger width, then it is possible for an integrated computer (described more fully with reference to FIG. 13) to sense the location of the user's different fingers. With this technique, it is feasible for a select button function to be determined by the finger which is used to operate it rather than by a particular switch at a fixed location. In other words, the communicator can allow the left mouse button function to be initiated by, for example, a brief squeeze of the user's index finger, regardless of where that index finger is positioned. Similarly, the right mouse button function might be initiated by a squeeze of the user's second finger, again independent of the precise positioning of the fingers. Alternatively, these could be separate virtual selectors (e.g., two rows of sensors/switches) for the selection function, operable by the same finger or different fingers.

Figure 1:
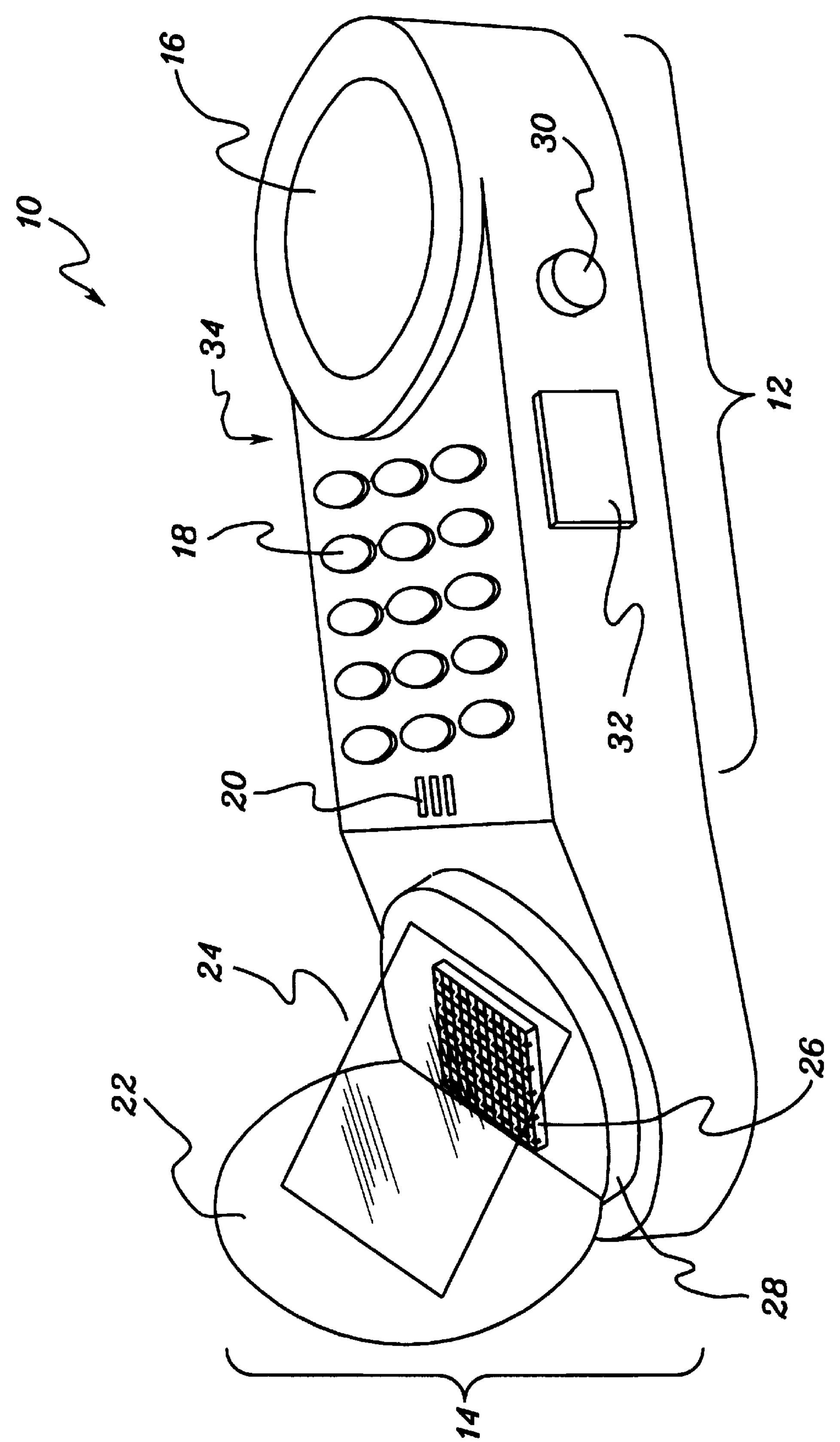
FIG. 1 depicts a first embodiment of a personal communicator in accordance with the present invention.

FIG. 1 depicts personal communicator 10 comprising handset phone 12 and virtual image display 14. Handset phone 12 comprises speaker 16, keypad 18 and microphone 20. Virtual image display 14 comprises curved mirror 22, partially reflective/transmissive optical element 24, display 26, rotating base 28, and a microprocessor or other integrated computer, (see FIG. 13). In addition, a stick-type pointing device 30 and selector 32 (i.e., one example of a means for pointing) provide control for a cursor viewed by a user on the virtual image display. Preferably, selector 32 corresponds to another pointing device on the opposite side 34 so that a user's thumb can control the pointing device, while their index or other finger controls the selector. The pointing means may provide, for example, one-dimensional or two-dimensional navigation of a cursor or other highlighter.

With presently available technology, it is also feasible to add large-vocabulary speech recognition as the pointing and/or selecting means, although this would likely affect the cost and power dissipation of the communicator. As one skilled in the art of speech recognition will know, speech recognition could be implemented in hardware alone, a combination of hardware and software, or, preferably, software alone. One example of a combination speech recognition implementation is IBM's VoiceType® Dictation 2.0. One example of a software speech recognition implementation is IBM's VoiceType® Application Factory, which runs on at least a 486-class processor, and provides both command and control functions. Another example of a software implementation is IBM's VoiceType® Dictation 3.0, which runs on at least a Pentium®-class processor, and provides command and control functions, as well as dictation.

Display 26 is preferably small, on the order of 33 mm or less diagonally, and can be monochrome or color. Partially reflective/transmissive optical element 24 could take several different forms, but the purpose is to reflect light from display 26 to curved mirror 22, while passing light from curved mirror 22. Partially reflective/transmissive optical element 24 could, for example, be a beamsplitter, and may incorporate a polarizer. Curved mirror 22 serves the purpose of reflecting the image from display 26 through partially reflective/transmissive optical element 24, creating a virtual image viewable while personal communicator 10 is being held to the ear of a user for optional simultaneous use of handset phone 12. Curved mirror 22 could, for example, have a radius of curvature on the order of twice the path length of the image from display 26 thereto (plus or minus approximately 20%).

Handset phone 12 and virtual image display 14 could be used together to enable wireless computer functions. For example, the handset phone could receive (and optionally transmit) digital data for the integrated computer, which displays information in the form of a virtual image. Alternatively, the integrated computer could be stand alone, or receive (and optionally transmit) digital data separate from the phone handset. This would allow a user to speak on the handset phone while using the integrated computer. Still another option is for the virtual image to be that of the person the user is speaking to on the handset phone.

In practice, the location of the virtual image is adjusted by rotating virtual image display 14 on rotating base 28. Further, a cursor element in the virtual image is controlled by a stick-type pointing device 30 and corresponding selector 132 (on side 34 opposite selector 32—see FIG. 3) conveniently located on handset phone 12 for a user's thumb and index finger, respectively. In addition, a second pointing device 130 (see FIG. 3) corresponding to selector 32 is located on the opposite side 34 of handset phone 12. Further, handset phone 12 may be a wireless handset phone (e.g. analog or digital cellular phone, or radio-signal based). Still further, personal communicator 10 may include a gravity-responsive switch (see FIG. 13). Depending on whether personal communicator 10 is used in the left or right hand of a user, the gravity-responsive switch would rotate the virtual image 180° to accommodate same.

Figure 2:
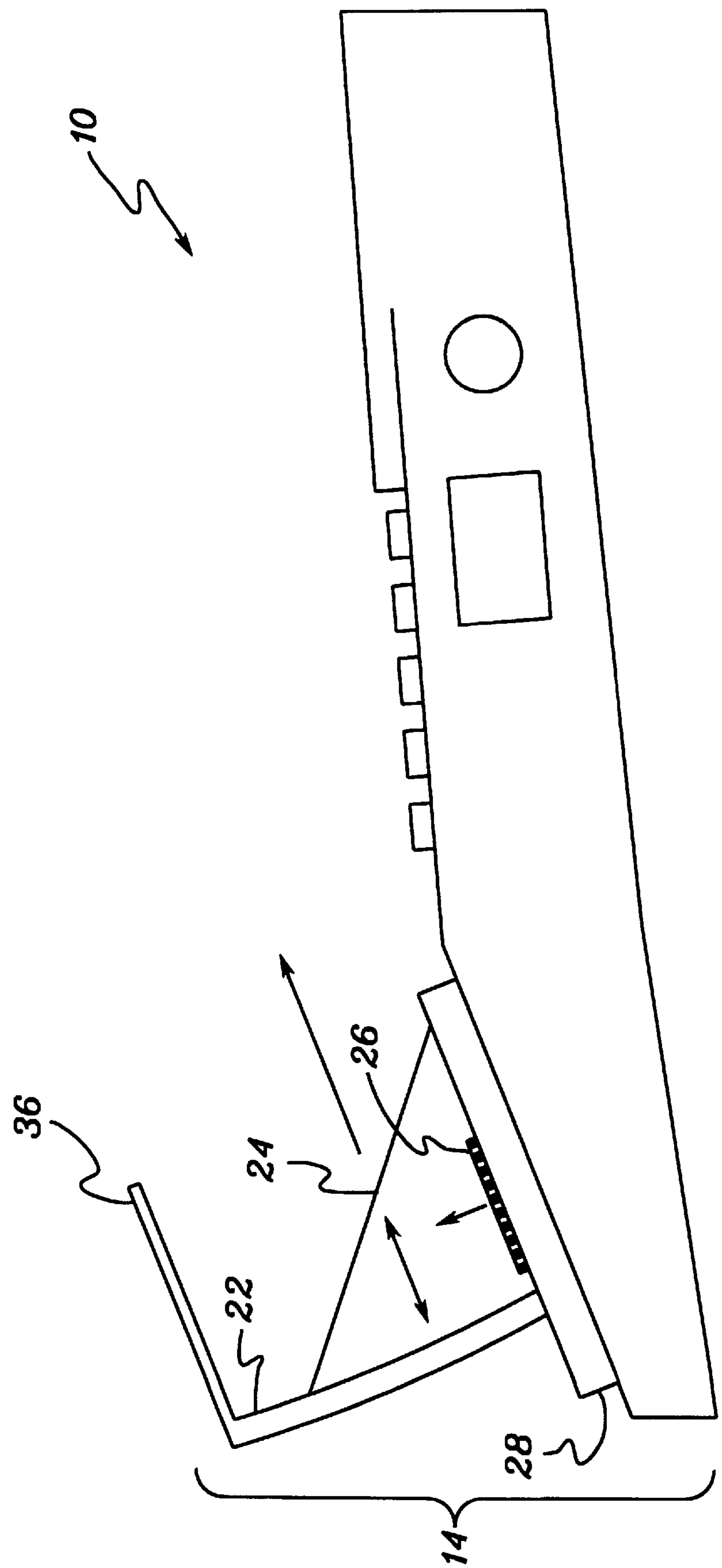
FIG. 2 is a side view of the personal communicator of FIG. 1.

FIG. 2 is a side view of personal communicator 10 from FIG. 1, along with an optional blocking optical element 36. Element 36 helps prevent glare on the virtual image from surrounding light. The creation of the virtual image will now be described in detail. As a real image is produced on display 26, the light from display 26 travels to partially reflective/transmissive optical element 24, where some portion of it is reflected thereby to curved mirror 22, where it is reflected back to partially reflective/transmissive optical element 24. Since partially reflective/transmissive optical element 24 allows some of the light originating from display 26 to pass therethrough upon reflection off curved mirror 22, a virtual image is thereby created, viewable by a user. Optional blocking element 36 may not be necessary where the partially reflective/transmissive optical element 24 incorporates a polarizer.

Figure 3:
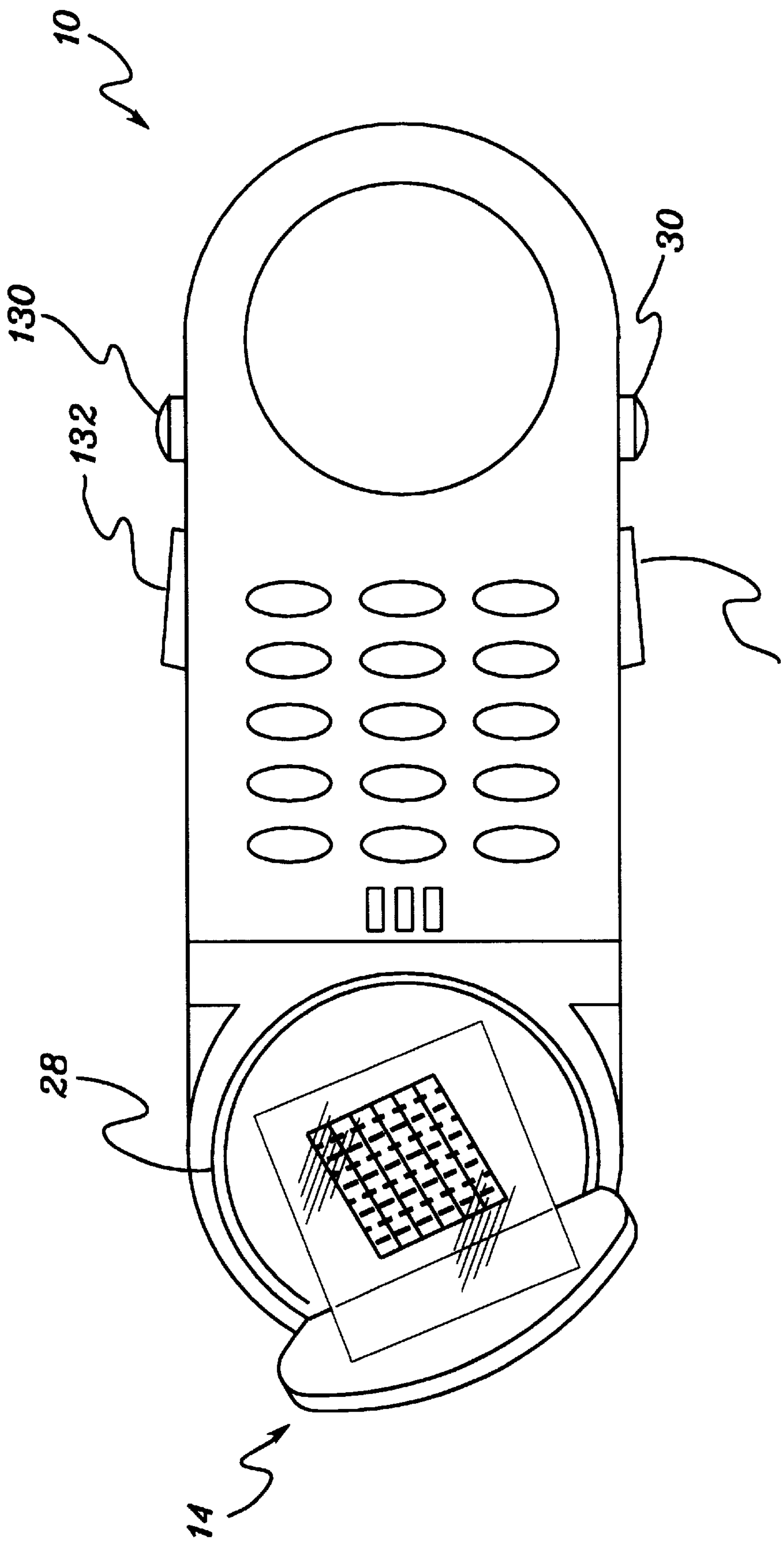
FIG. 3 is a top view of the personal communicator of FIG. 1 with the virtual image display rotated.

FIG. 3 is a top view of the personal communicator 10 of FIG. 1 with the virtual image display 14 rotated on base 28. In addition, from the top view, the other set of pointing device 130 and selector 132 are shown. As described above, pointing device 130 preferably corresponds to selector 32, and pointing device 30 preferably corresponds to selector 132.

Figure 4:
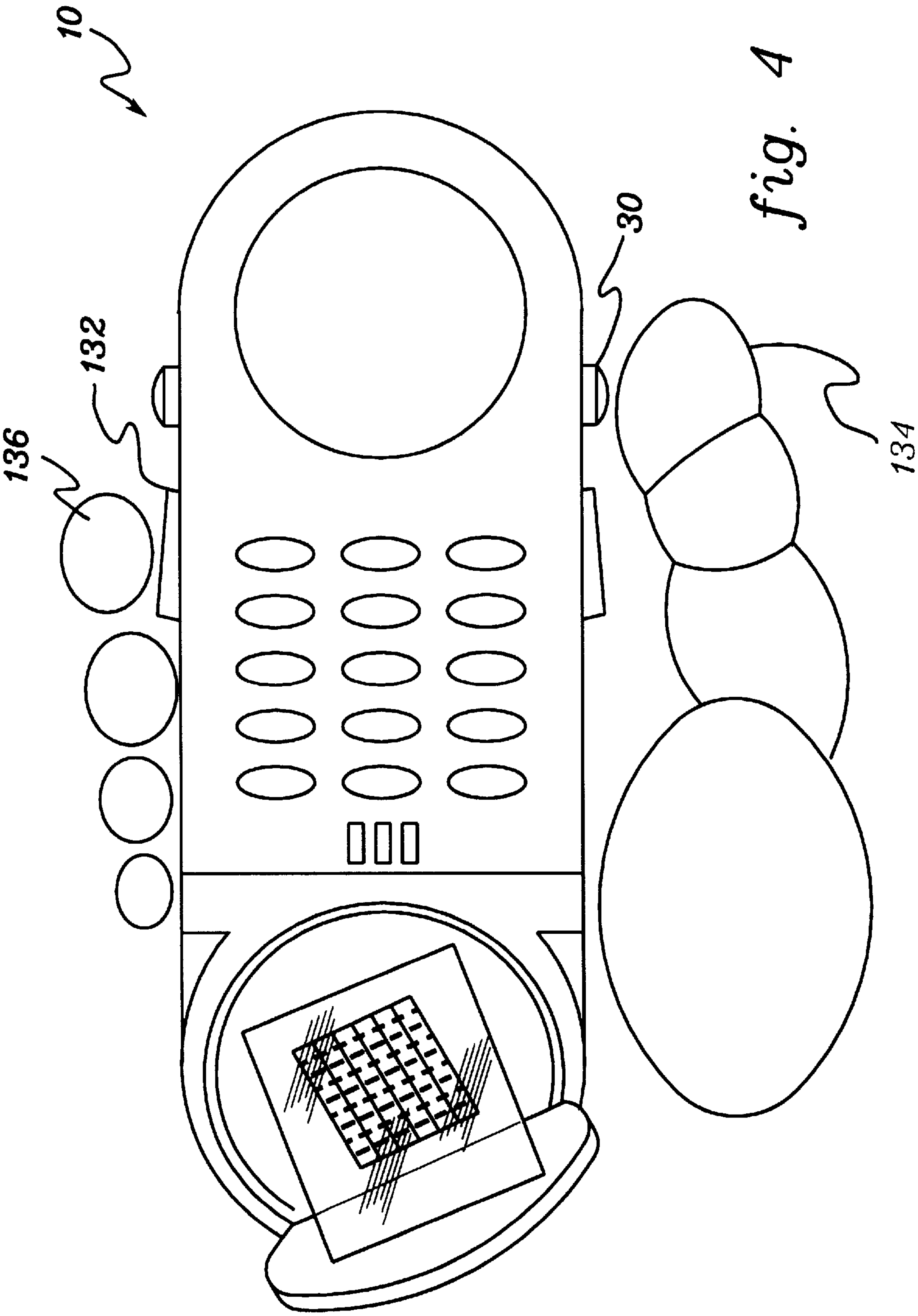
FIG. 4 depicts the personal communicator of FIG. 4 in use.

FIG. 4 depicts the personal communicator of FIG. 3 in use. As shown, a user's thumb 134 operates stick-type pointing device 30, while the corresponding selector 132 is operated by the user's index finger 136.

Figure 5:
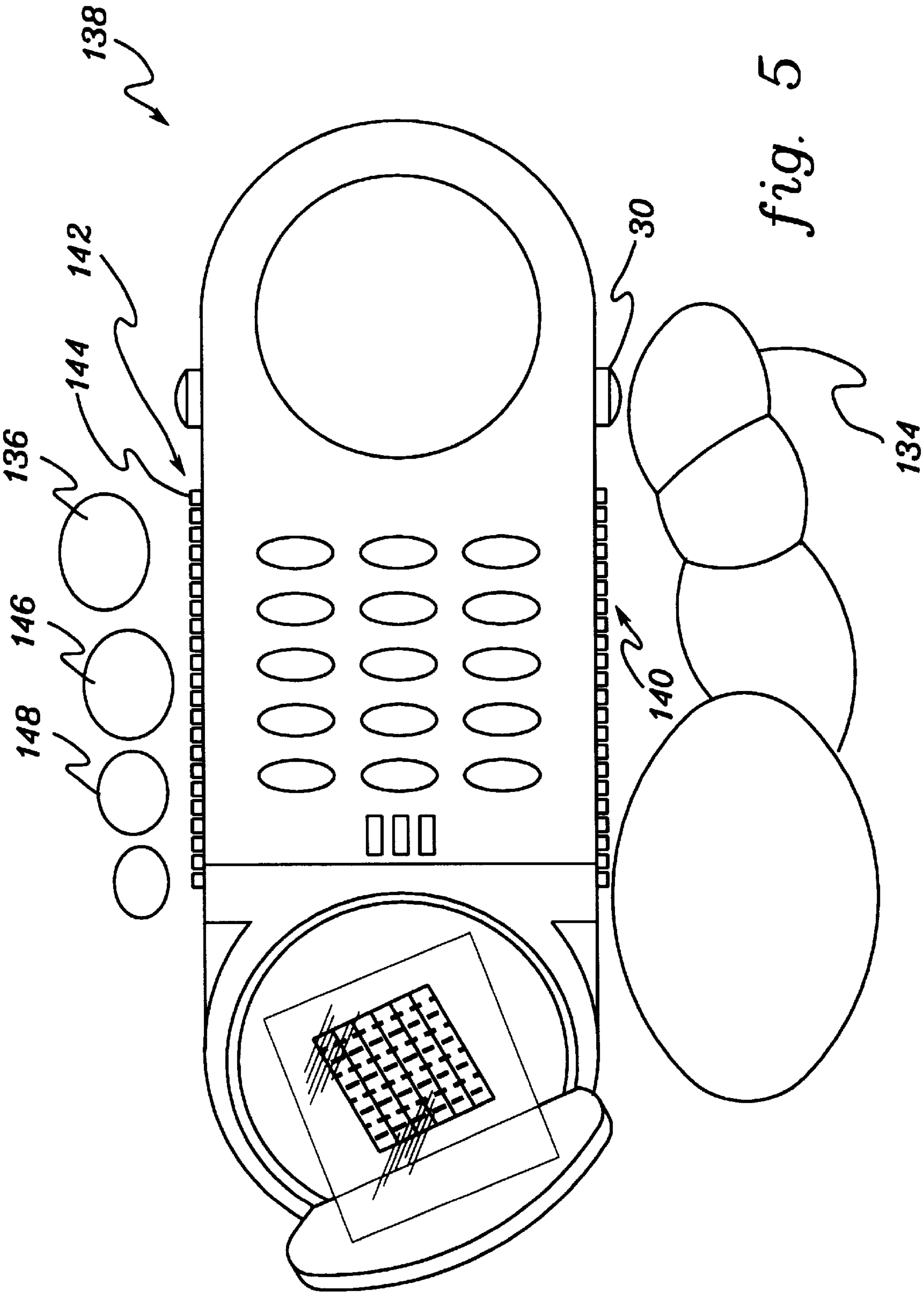
FIG. 5 depicts a modified version of the personal communicator of FIG. 4.

FIG. 5 depicts a personal communicator 138 that is a modified version of personal communicator 10 shown in FIG. 4. The only difference between communicator 138 and communicator 10 is that communicator 138 replaces the individual selectors 32 and 132 with virtual selectors 140 and 142, respectively. The virtual selectors are each comprised of a plurality of individual pressure sensors, switches or the like (e.g., sensor 144). As previously described, such virtual selectors would allow selection to be accomplished, regardless of the actual location of the user's finger. Thus, any of the user's fingers (e.g., index finger 136, middle finger 146, or third finger 148) could be used to perform the selection task.

Figure 6:
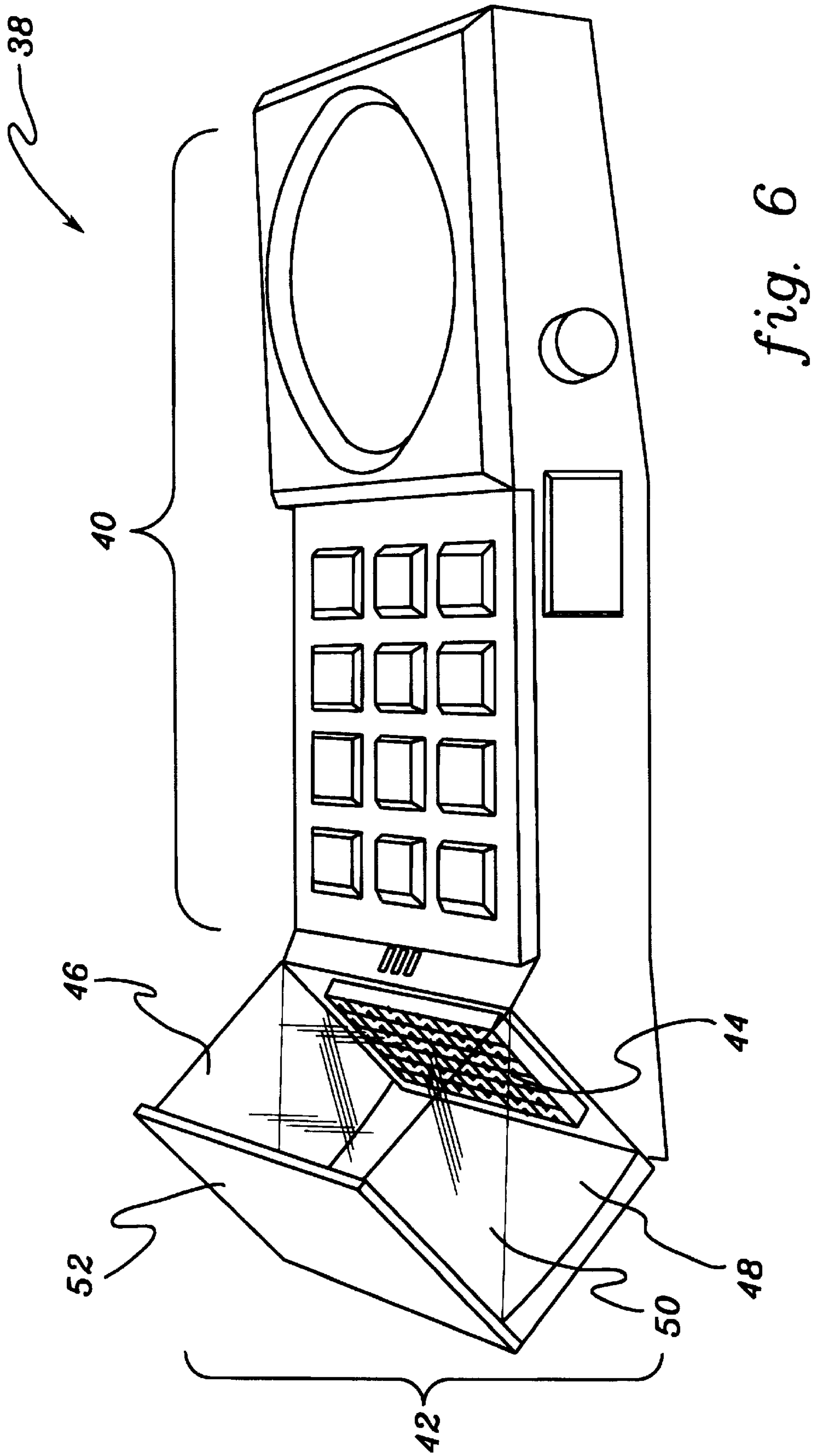
FIG. 6 depicts a second embodiment of a personal communicator in accordance with the present invention, shown in an opened position.

FIG. 6 depicts a second embodiment of a personal communicator 38 in accordance with the present invention. The handset phone portion 40 of personal communicator 38 is similar to that in the first embodiment. However, virtual image display 42, while operable according to the same basic principles, is somewhat different than that in the first embodiment. For example, display 44 of virtual image display 42 is fixed and does not rotate. As another example, virtual image display 42 includes another optical element 46 allowing the virtual image to be viewed during left-hand or right-hand use of personal communicator 38 without manually rotating the virtual image display, as done in the first embodiment. Optical element 46 may be, for example, a diffraction grating or a lenticular lens. As one skilled in the art will know, a diffraction grating is a transparent plate or member including many finely ruled, closely spaced, usually equidistant horizontal lines, but may also be made holographically consisting of, for example, a di-chromated gelatin layer sandwiched between glass plates; and a lenticular lens is a saw-toothed, grooved structure splitting the image into at least two directions. The inclusion of optical element 46 may require that display 44 be monochrome, since diffractive or holographic elements tend to be sensitive (or behave differently) to wavelength variations. Also shown as part of virtual image display 42 are curved mirror 48, partially reflective/transmissive optical element 50, and ambient light blocking optical element 52.

Figure 7:
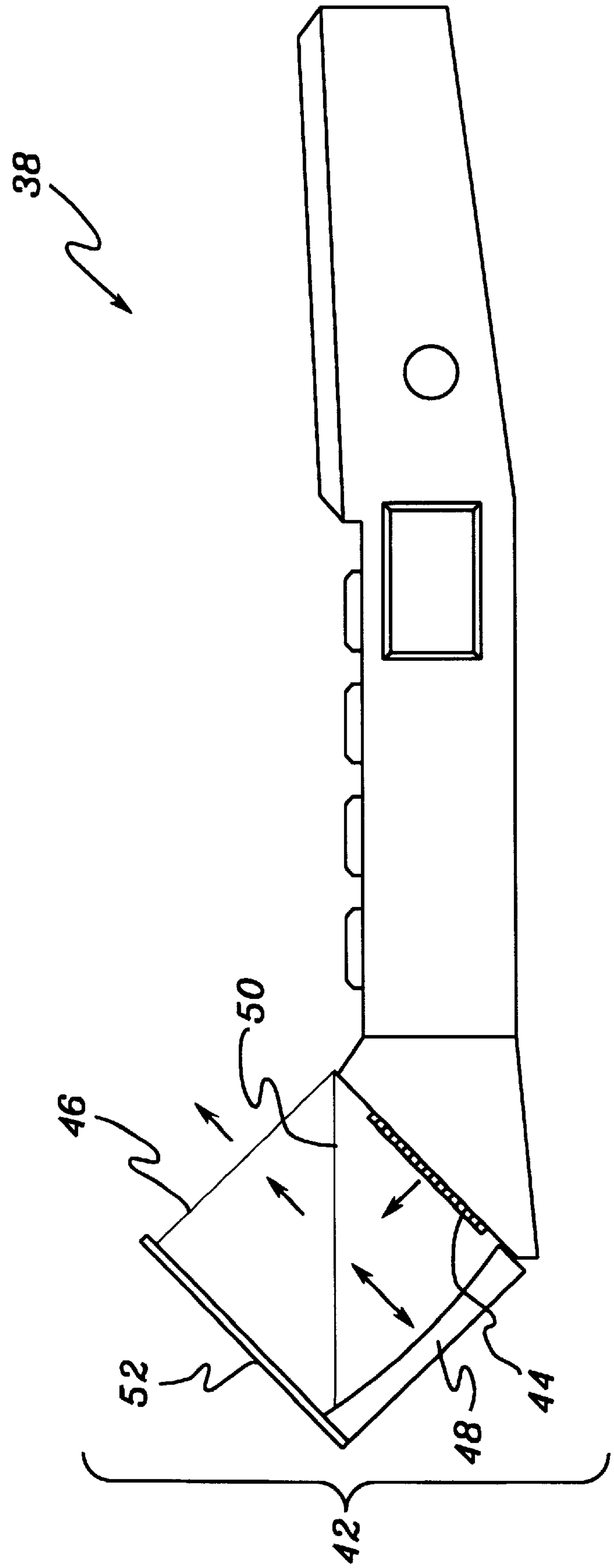
FIG. 7 is a side view of the personal communicator of FIG. 6.

FIG. 7 is a side view of the personal communicator of FIG. 6. As shown in FIG. 7, light from display 44 reflects off partially reflective/transmissive optical element 50 and onto curved mirror 48. Curved mirror 48 then reflects the light back to partially reflective/transmissive optical element 50, which passes therethrough to the second optical element 46, which redirects the light for viewing from at least two different directions. Again, blocking surface 52 serves to prevent ambient light from interfering with the virtual image.

Figure 8:
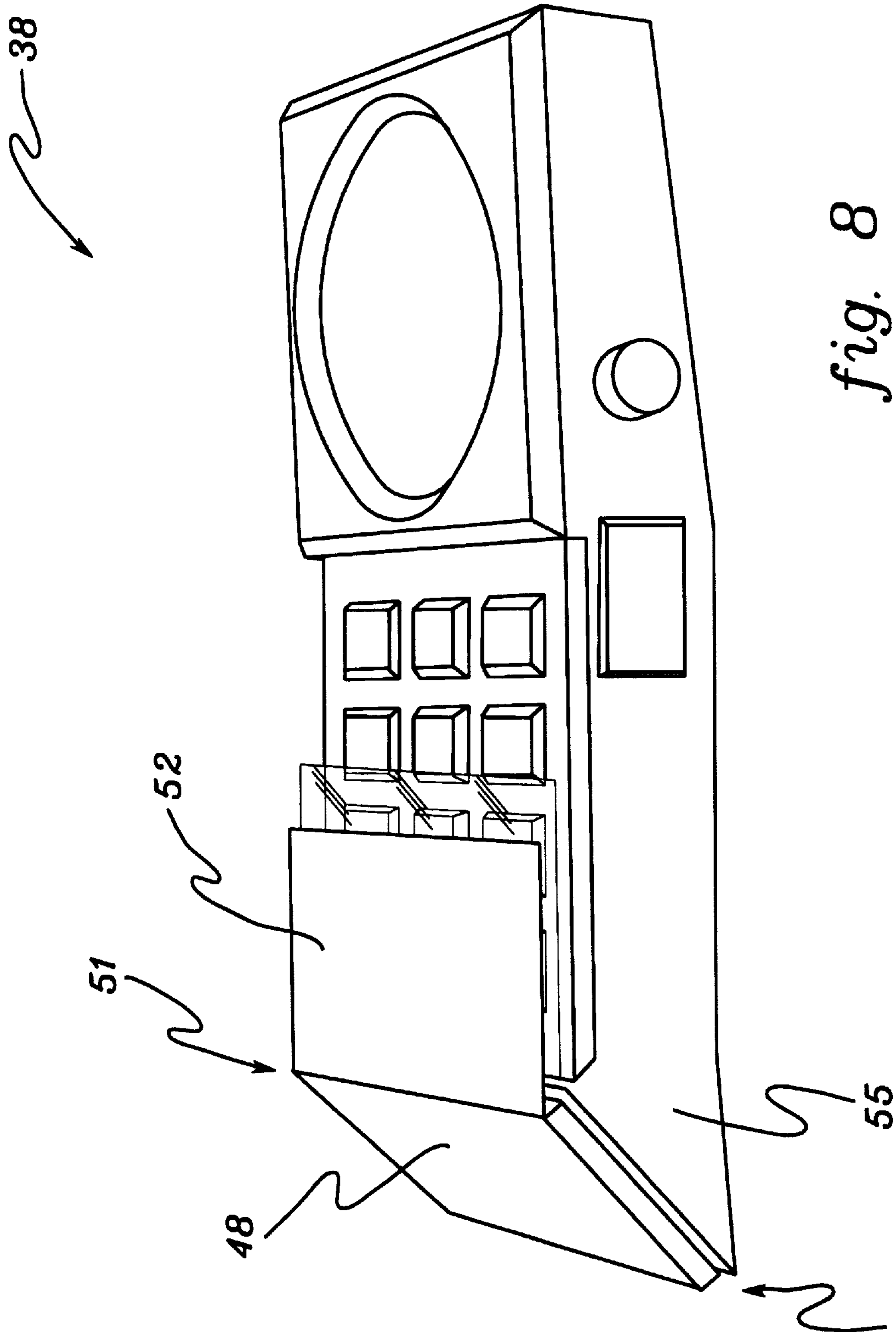
FIG. 8 depicts the personal communicator of FIG. 6 in a closed position.

FIG. 8 depicts another difference between the second and first embodiments. Shown in FIG. 8 are the various optical elements of virtual image display 42 in a closed position, whereby the optical elements are foldable. This could be accomplished, for example, by utilizing hinge members in an area 51 joining curved mirror 48 and blocking surface 52, and in an area 53 joining curved mirror 48 and base 55.

Figure 9:
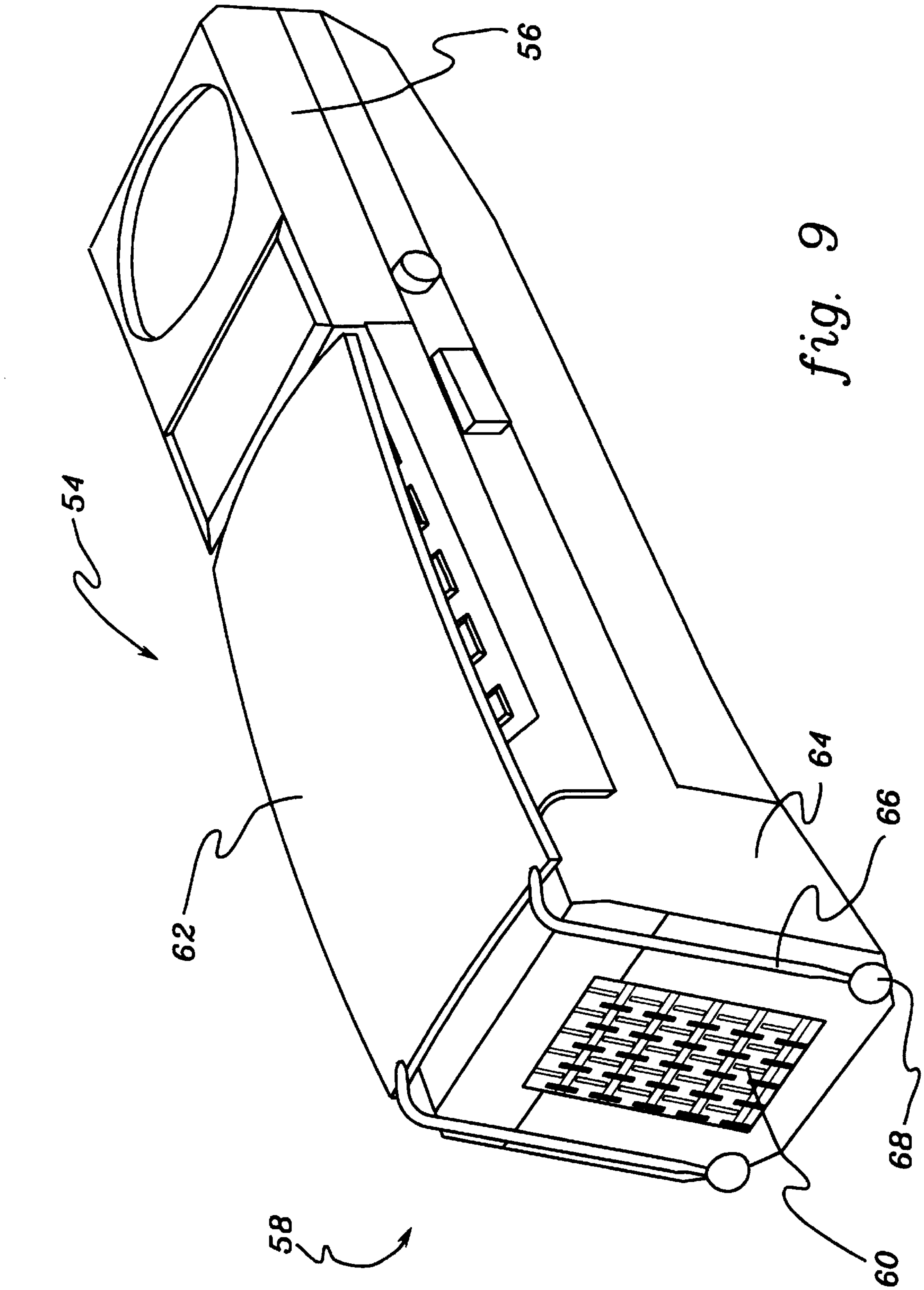
FIG. 9 depicts a third embodiment of a personal communicator in accordance with the present invention, shown in a closed position.

FIG. 9 depicts a third embodiment of a personal communicator 54 in accordance with the present invention. Handset phone 56 is similar to the handset phones for the other embodiments. However, virtual image display 58 is different in design from the other embodiments. Virtual image display 58 comprises display 60 and curved mirror 62 (shown in a closed position). As can be seen, curved mirror 62 is longer than the curved mirror of the previous embodiments. Further, curved mirror 62 is attached to base 64 by a pair of support arms (e.g., support arm 66). The support arms are attached to base 64 by ball joints or the like (e.g., ball joint 68), allowing curved mirror 62 to assume the closed position shown in FIG. 9.

Figure 10:
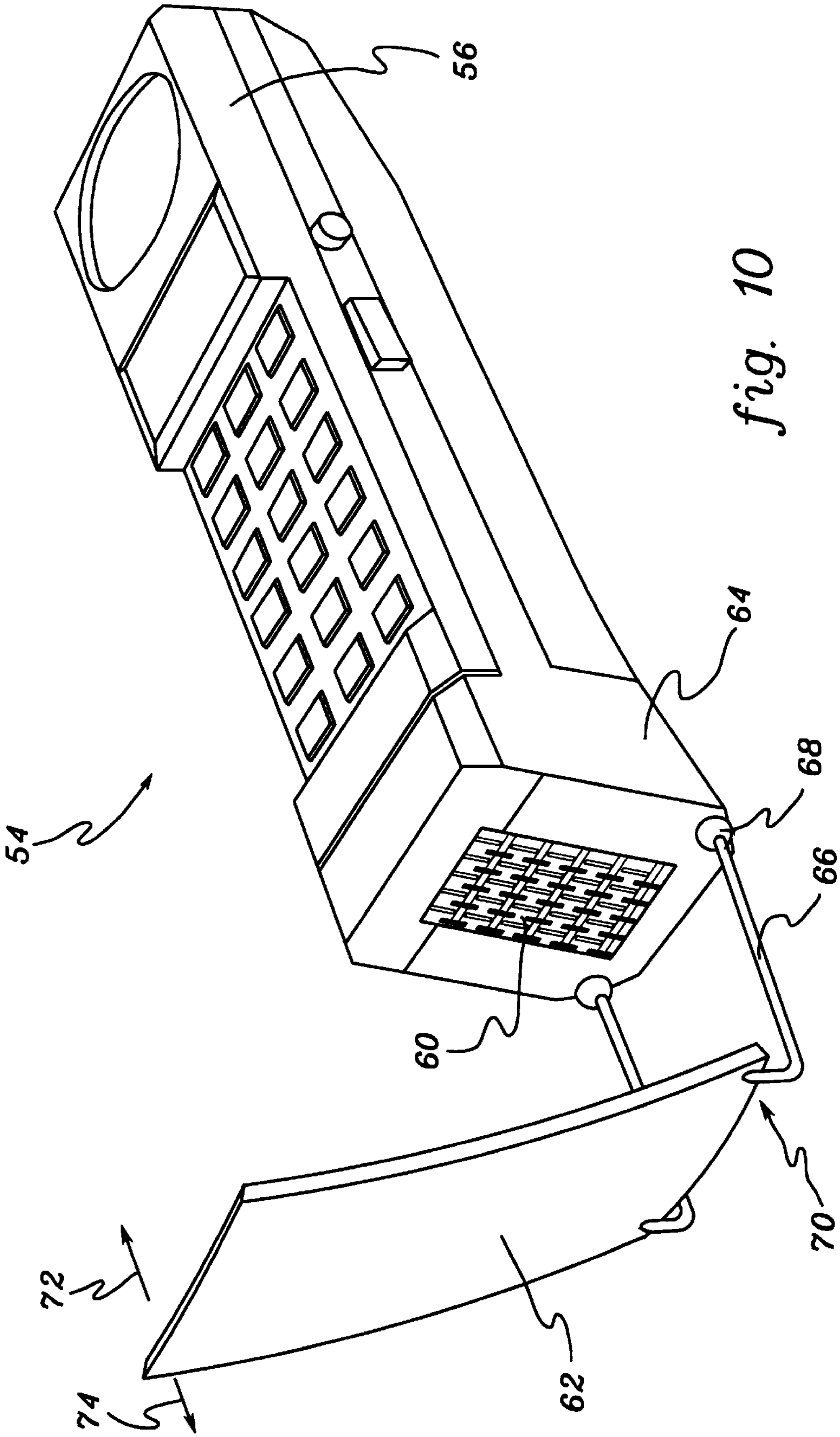
FIG. 10 depicts the personal communicator of FIG. 9 in an opened position.

FIG. 10 depicts the personal communicator 54 of FIG. 9 in the opened position. Unlike the first two embodiments, the embodiment depicted in FIGS. 9 and 10 does not have a partially reflective/transmissive optical element. Rather, curved mirror 62 is sized and spaced from display 62 to provide a virtual image from a single reflection. Optionally, pivots, ball joints or the like could be included at the connection of the support arms and curved mirror 62 (e.g., at location 70). This would allow curved mirror 62 to be tilted in a direction 72 toward display 60 and/or in a direction 74 away therefrom.

Figure 11:
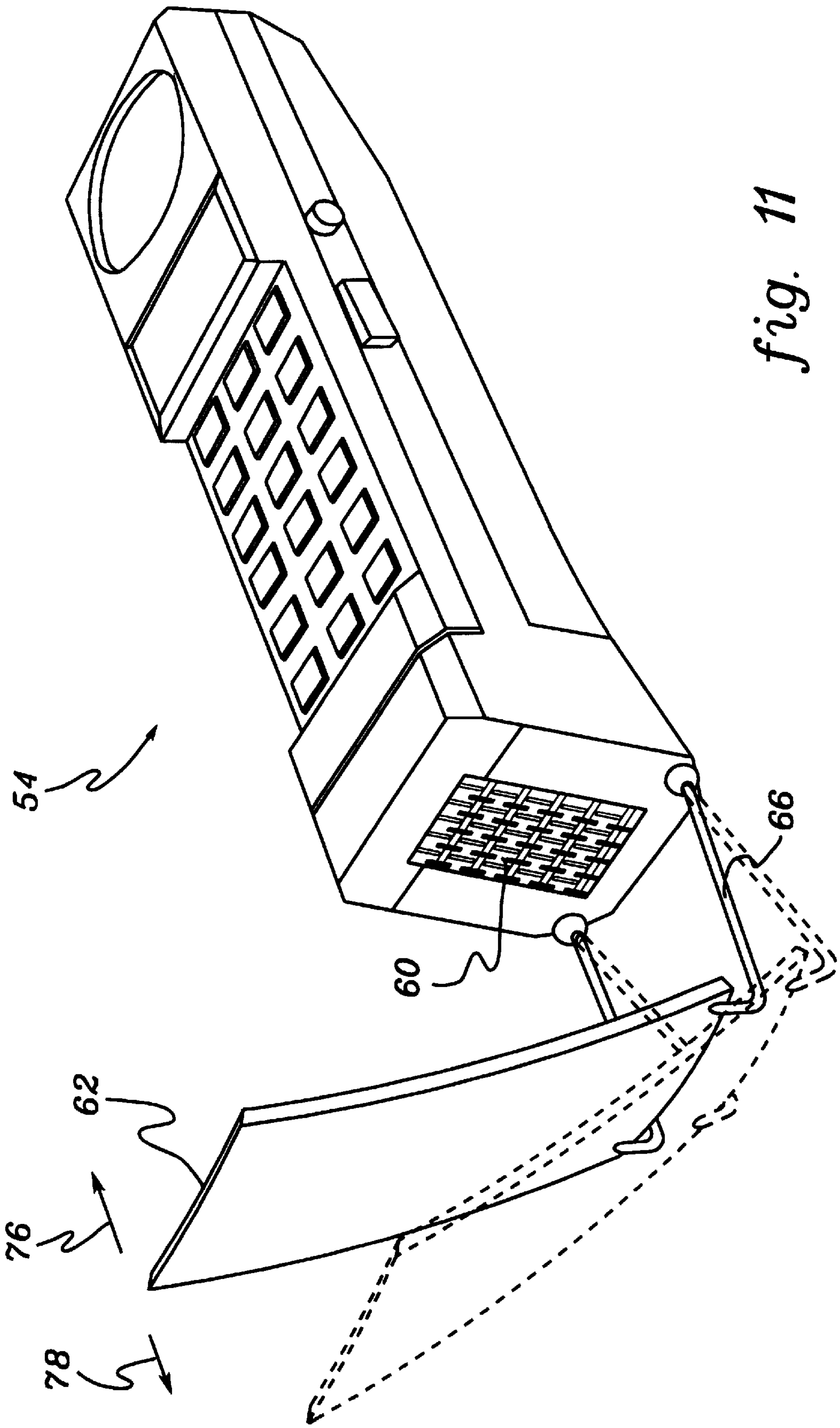
FIG. 11 depicts the personal communicator of FIG. 10 with an optional feature for the virtual display.

FIG. 11 depicts the personal communicator 54 of FIG. 10 with optional parallelogram linkage motion for curved mirror 62. With appropriate jointing at either end of the support arms (e.g., support arm 66), curved mirror 62 could be moved in a direction 76 to the right of the original center position shown in FIG. 10, or in a direction 78 to the left of the original center position (shown in phantom in FIG. 11).

Figure 12:
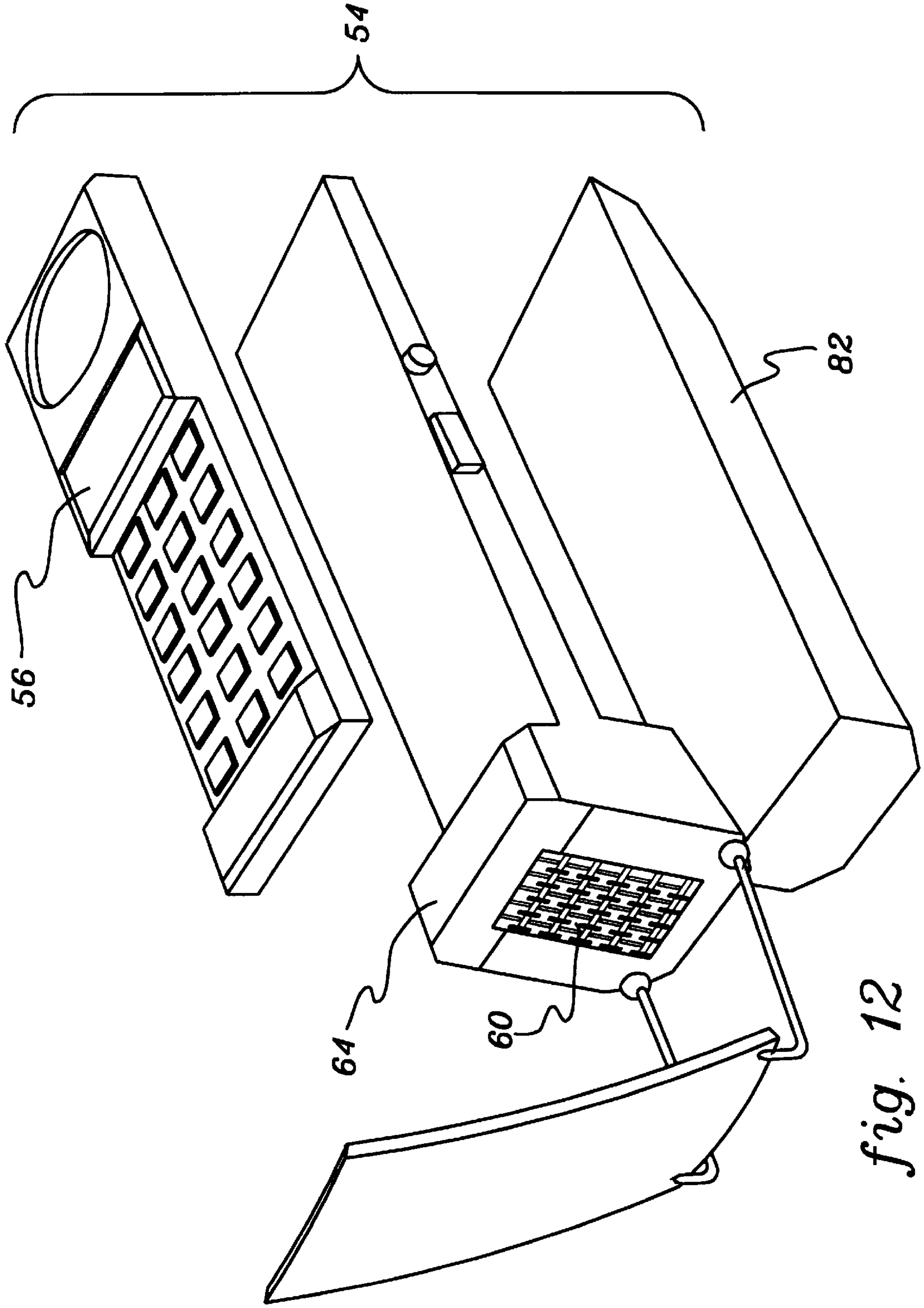
FIG. 12 depicts the personal communicator of FIGS. 9 through 11 in modular form.

FIG. 12 depicts the personal communicator 54 of FIGS. 9 through 11 in modular form. Handset phone 56 and battery pack 82 could comprise, for example, a conventional cellular or other wireless phone. Base 64 houses display 60 along with a limited function or other computer (see FIG. 13). However, it would be understood that battery pack 82, if designed only for a phone, would have a more limited operational period when used in communicator 54, due to the increased power needs from, e.g., display 60. In addition, such a modular design would allow one to take only the handset phone portion 56 (and battery 82) on particular occasions, rather than all the modules of personal communicator 54.

As used in connection with the present exemplary embodiment, the term "limited-function computer" refers to a computer that would coordinate the functions of the handset phone and virtual image display, as well as allow a pointing device and selector to be used with the virtual image display. As one example, a microprocessor could be used. It will be understood that a computer with greater or different functionality could be used in the present invention.

Figure 13:
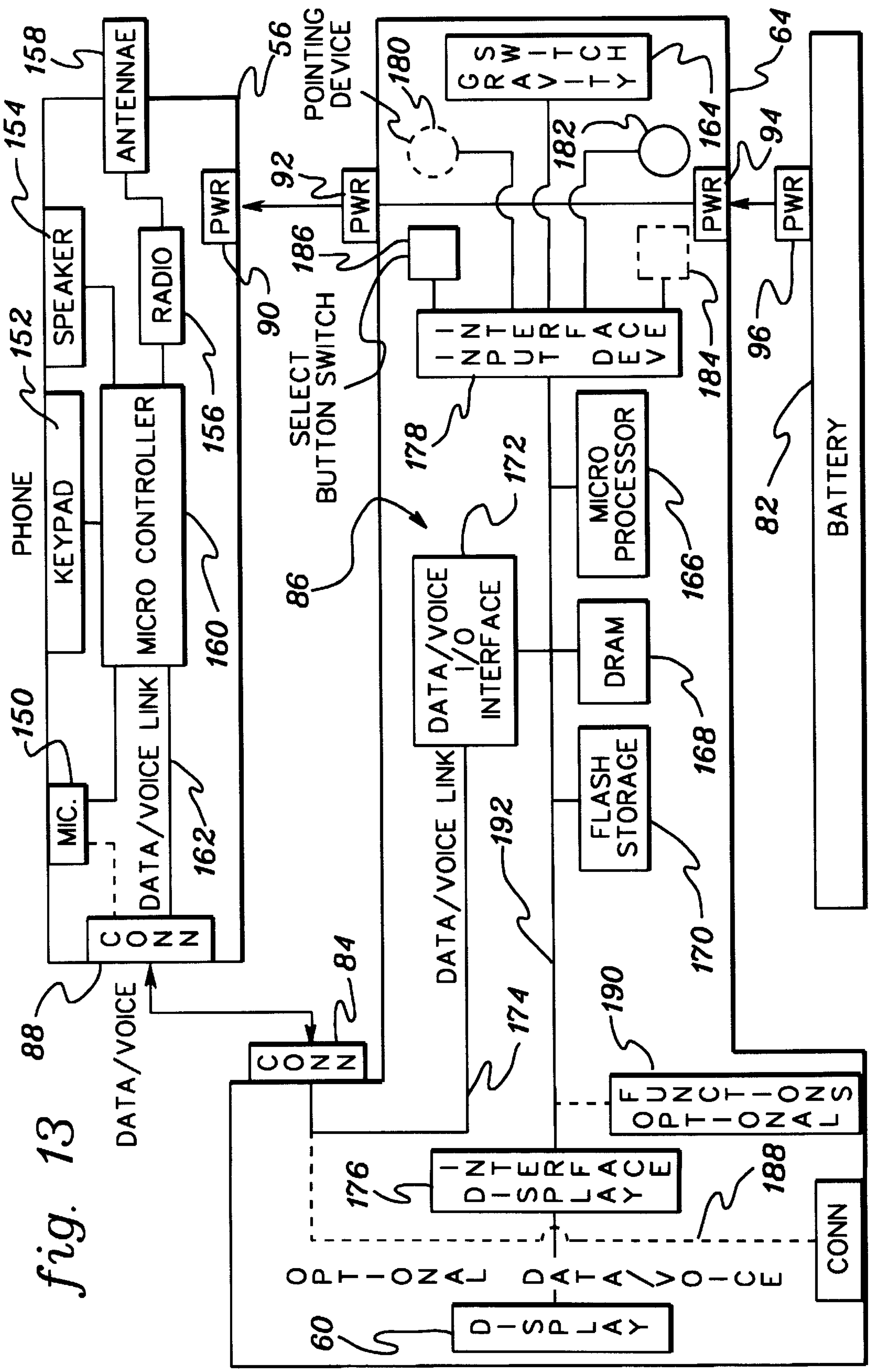
FIG. 13 is a block diagram/cross-sectional view of the modules of the personal communicator of FIG. 12.

FIG. 13 is a block diagram/cross-sectional view of the various modules of personal communicator 54 from FIG. 12 (shown without the curved mirror and support arms). A connector 84 from base 64 mates with a connector 88 on handset phone 56, providing a connection between handset phone 56 and computer 86. In addition, power connections are made from handset phone 56 through base 64 to battery pack 82 (e.g., corresponding power connections 90, 92, 94 and 96). Optionally, the power on and/or off for handset phone 56 may be separate from that for base 64. As another option, display 60 and/or computer 86 may include automatic shut-down when not in use, similar to modern notebook computers.

Handset phone 56 comprises microphone 150, keypad 152, speaker 154, radio 156, antenna 158, micro-controller 160 and data/voice link 162 between connector 88 and micro-controller 160. One skilled in the art will understand the operation of handset phone 56.

Base 64 comprises display 60, computer 86 and gravity switch 164. Computer 86 comprises microprocessor 166, DRAM 168 and flash storage 170. A data/voice I/O interface 172 connects computer 86 via data/voice link 174 to microphone 150. A display interface 176 connects display 60 with computer 86 and the pointing means (through interface 178). The pointing means comprises pointers 180 and 182, along with the corresponding selectors 184 and 186, respectively. Optionally, another data/voice link 188 could be included for connecting to external devices, such as, for example, a display, a microphone, a keyboard, or other I/O devices and combinations thereof. Further, optional devices 190 may be included and linked to bus 192. For example, storage expansion, a security smartcard or bar code or magnetic stripe reader could be included.

Figure 14:
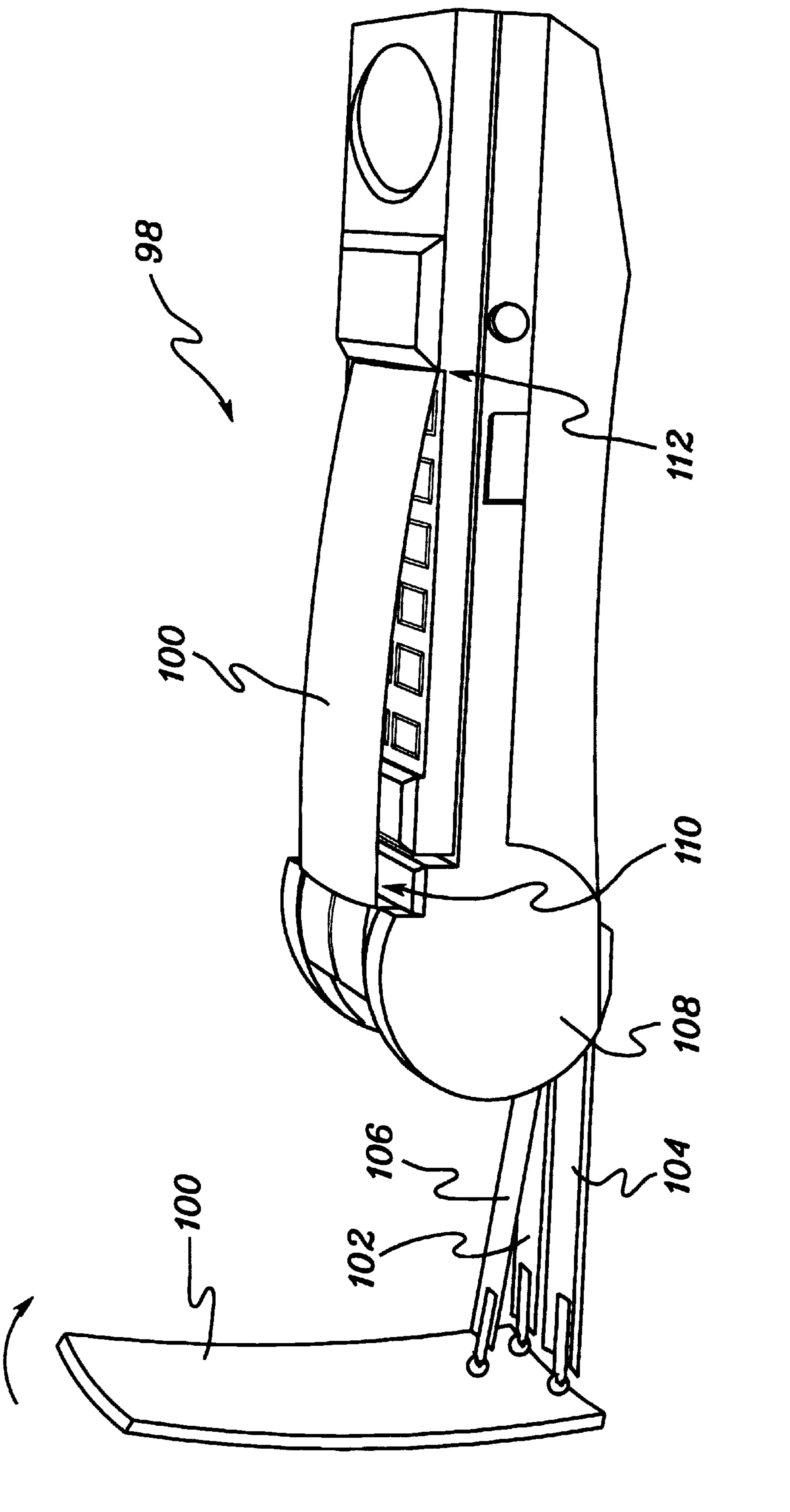
FIG. 14 depicts a fourth embodiment of a personal communicator in accordance with the present invention, shown both in an opened and closed position.

FIG. 14 depicts a fourth embodiment of a personal communicator 98 in accordance with the present invention. Personal communicator 98 is similar to the third embodiment shown in FIG. 10, however, the means of support for curved mirror 100 are different. Specifically, three semi-flexible straps 102, 104 and 106 connect curved mirror 100 to base 108. As shown in FIG. 14, semi-flexible strap 102 is generally obscured by strap 106. Straps 102 and 104 are below strap 106. Semi-flexible straps 102, 104 and 106, in their most crude form, could be, for example, similar to a metal tape measure. As such, the straps are rigid when in the open position, but are flexible enough to bend such that a closed position can be assumed (FIG. 14 also shows the closed position). Locations 110 and 112 are possible locations for some type of closure mechanism (with or without a separate release button) for the curved mirror.

Figure 15:
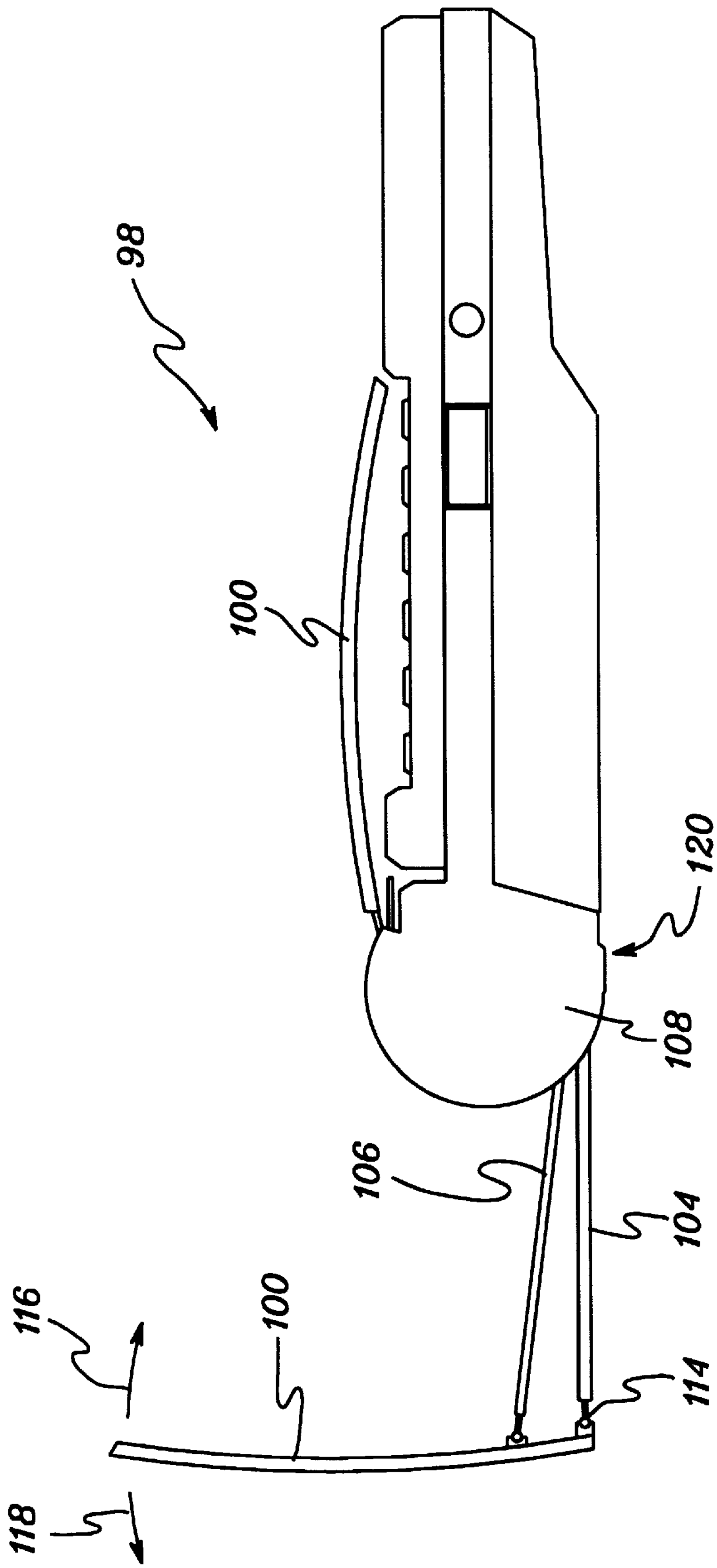
FIG. 15 is a side view of the personal communicator of FIG. 14.

FIG. 15 is a side view of the personal communicator 98 of FIG. 14. Optionally, curved mirror 100 may be connected to the semi-flexible straps by, for example, ball joints (e.g., ball joint 114). Such a connection would allow curved mirror 100 to be titled in a direction 116 toward base 108 or in a direction 118 away from base 108, if the mounting at location 120 allows for at least limited sliding motion for strap 106. In addition, a swivel joint at location 120 would allow curved mirror 100 to be rotated to left or right of the center position shown in FIG. 14.

Figure 16:
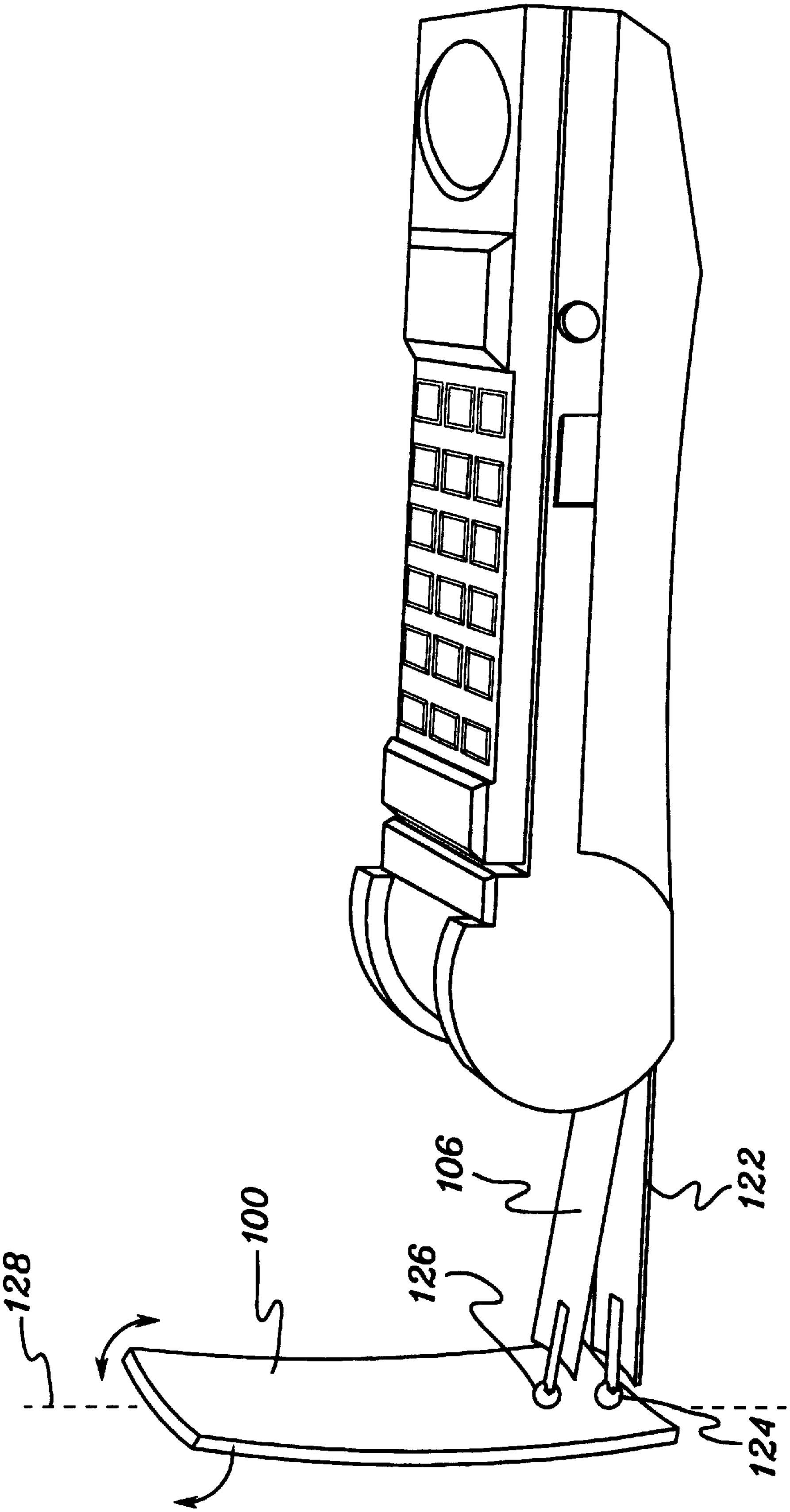
FIG. 16 depicts a modified version of the personal communicator of FIG. 14.

In an alternative version of the fourth embodiment, shown in FIG. 16, bottom straps 102 and 104 are replaced by a single semi-flexible strap 122 connected to curved mirror 100 by a ball joint 124. Strap 106 above strap 122 is also connected to curved mirror 100 by a ball joint 126. With ball joints 124 and 126 in a vertical line, curved mirror 100 could partially pivot about a vertical axis 128 to permit viewing in either right- or left-handed usage.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A personal communicator, comprising:

a handset phone;

a virtual image display coupled to the handset phone, wherein the virtual image display comprises a curved mirror coupled to the handset phone by a support, and wherein the support comprises a support arm;

means coupled to the handset phone for positioning a cursor on the virtual image display; and means for selecting on the virtual image display.

2. The personal communicator of claim 1, wherein the support arm is translatable with respect to the handset phone.

3. A personal communicator, comprising:

a handset phone;

a virtual image display coupled to the handset phone, comprising a curved mirror coupled to the handset phone by a support arm moveable with respect to the handset phone, wherein the curved mirror also serves as a cover for at least a portion of the handset phone;

means for pointing on the virtual image display; and means for selecting on the virtual image display.

4. A personal communicator, comprising:

a handset phone;

a virtual image display coupled to the handset phone, comprising a curved mirror coupled to the handset phone by a support arm, wherein the curved mirror is moveable with respect to the support arm;

means for pointing on the virtual image display; and means for selecting on the virtual image display.

5. A personal communicator, comprising:

a handset phone;

a virtual image display coupled to the handset phone, wherein the virtual image display comprises a curved mirror;

means coupled to the handset phone for positioning a cursor on the virtual image display; and means for selecting on the virtual image display;

wherein the curved mirror is coupled to the handset phone by a support, the support comprising a support arm, wherein the curved mirror is translatable with respect to the handset phone, and wherein the curved mirror is rotatable with respect to the handset phone.

6. A personal communicator, comprising:

a handset phone;

a virtual image display coupled to the handset phone, comprising a curved mirror coupled to the handset phone by a support arm, wherein the support arm comprises a semi-flexible strap;

means for pointing on the virtual image display; and means for selecting on the virtual image display.

7. A personal communicator, comprising:

a handset phone;

a virtual image display coupled to the handset phone;

means for pointing on the virtual image display, wherein the means for pointing comprises a pair of pointers situated on opposite sides of the handset phone; and means for selecting on the virtual image display.

8. A personal communicator, comprising:

a handset phone;

virtual image display coupled to the handset phone;

means coupled to the handset phone for positioning a cursor on the virtual image display, comprising a stick-type pointing device; and means for selecting on the virtual image display.

9. A personal communicator, comprising:

a handset phone;

a virtual image display coupled to the handset phone;

means coupled to the handset phone for positioning a cursor on the virtual image display; and means for selecting on the virtual image display, comprising a button with a fixed position on the handset phone.

10. A personal communicator, comprising:

a handset phone;

a virtual image display coupled to the handset phone;

means coupled to the handset phone for positioning a cursor on the virtual image display; and means for selecting on the virtual image display, comprising a virtual selector.

11. The personal communicator of claim 10, wherein the virtual selector comprises an array of pressure sensors, and wherein immediately adjacent pressure sensors are spaced by a distance less than the width of an average human finger.

12. The personal communicator of claim 10, wherein the virtual selector comprises an array of switches, and wherein immediately adjacent switches are spaced by a distance less than the width of an average human finger.

13. A personal communicator, comprising:

a handset phone;

a virtual image display coupled to the handset phone;

means coupled to the handset phone for positioning a cursor on the virtual image display, comprising means for speech recognition; and means for selecting on the virtual image display.

14. A personal communicator, comprising:

a handset phone;

a virtual image display coupled to the handset phone;

means coupled to the handset phone for positioning a cursor on the virtual image display; and means for selecting on the virtual image display, comprising means for speech recognition.

15. A personal communicator, comprising:

a handset phone;

a virtual image display coupled to the handset phone;

means coupled to the handset phone for positioning a cursor on the virtual image display, and means for selecting on the virtual image display;

wherein the handset phone and virtual image display are housed in connectable modules.

* * * * *